United States Patent
Ogura et al.

(10) Patent No.: US 8,619,163 B2
(45) Date of Patent: Dec. 31, 2013

(54) SOLID STATE IMAGING USING A CORRECTION PARAMETER FOR CORRECTING A CROSS TALK BETWEEN ADJACENT PIXELS

(75) Inventors: Masanori Ogura, Tokyo (JP); Toru Koizumi, Yokohama (JP); Satoshi Koizumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 415 days.

(21) Appl. No.: 12/874,119

(22) Filed: Sep. 1, 2010

(65) Prior Publication Data
US 2011/0069210 A1    Mar. 24, 2011

(30) Foreign Application Priority Data

Sep. 18, 2009 (JP) ................................ 2009-217379
Sep. 18, 2009 (JP) ................................ 2009-217380

(51) Int. Cl.
*H04N 5/217* (2011.01)
*H04N 9/083* (2006.01)

(52) U.S. Cl.
USPC ............ 348/242; 348/250; 348/273; 348/280

(58) Field of Classification Search
USPC ....................................................... 348/243
See application file for complete search history.

(56) References Cited

U.S. PATENT DOCUMENTS

| | | | |
|---|---|---|---|
| 7,561,194 B1 * | 7/2009 | Luo ............................... | 348/241 |
| 7,583,296 B2 | 9/2009 | Shirai | |
| 7,728,887 B2 * | 6/2010 | Ueda ............................. | 348/248 |
| 7,990,444 B2 | 8/2011 | Kudoh | |
| 8,035,709 B2 * | 10/2011 | Kinoshita ..................... | 348/272 |
| 8,199,223 B2 * | 6/2012 | Sasaki .......................... | 348/241 |
| 8,350,934 B2 * | 1/2013 | Chao et al. .................... | 348/242 |
| 2002/0060742 A1 * | 5/2002 | Takubo ......................... | 348/241 |
| 2007/0146511 A1 | 6/2007 | Kinoshita et al. | |
| 2009/0096887 A1 | 4/2009 | Tamaoki | |
| 2009/0128671 A1 * | 5/2009 | Kusaka ......................... | 348/246 |

FOREIGN PATENT DOCUMENTS

| | | |
|---|---|---|
| JP | 9-69617 A | 3/1997 |
| JP | 2004-135206 | 4/2004 |
| JP | 2007-142697 | 6/2007 |
| JP | 2007-267228 A | 10/2007 |
| JP | 2009-100203 A | 5/2009 |
| JP | 2009-188461 A | 8/2009 |
| JP | 2009-206210 A | 9/2009 |

\* cited by examiner

*Primary Examiner* — Ngoc-Yen Vu
(74) *Attorney, Agent, or Firm* — Fitzpatrick, Cella, Harper & Scinto

(57) ABSTRACT

An image processing apparatus, for correcting a cross talk between adjacent pixels, includes: a memory unit for storing a correction parameter for reducing a cross talk signal leaked to an object pixel from an adjacent pixel, the correction parameter corresponding to a position of the object pixel; and a correcting unit for subtracting, based on the correction parameter stored in the memory unit, the cross talk signal from a pixel signal of the solid-state imaging apparatus correspondingly to a position of the pixel, wherein a number of the object pixel is at least two, and the at least two object pixels have different addresses in a horizontal direction, and different addresses in a vertical direction.

9 Claims, 14 Drawing Sheets

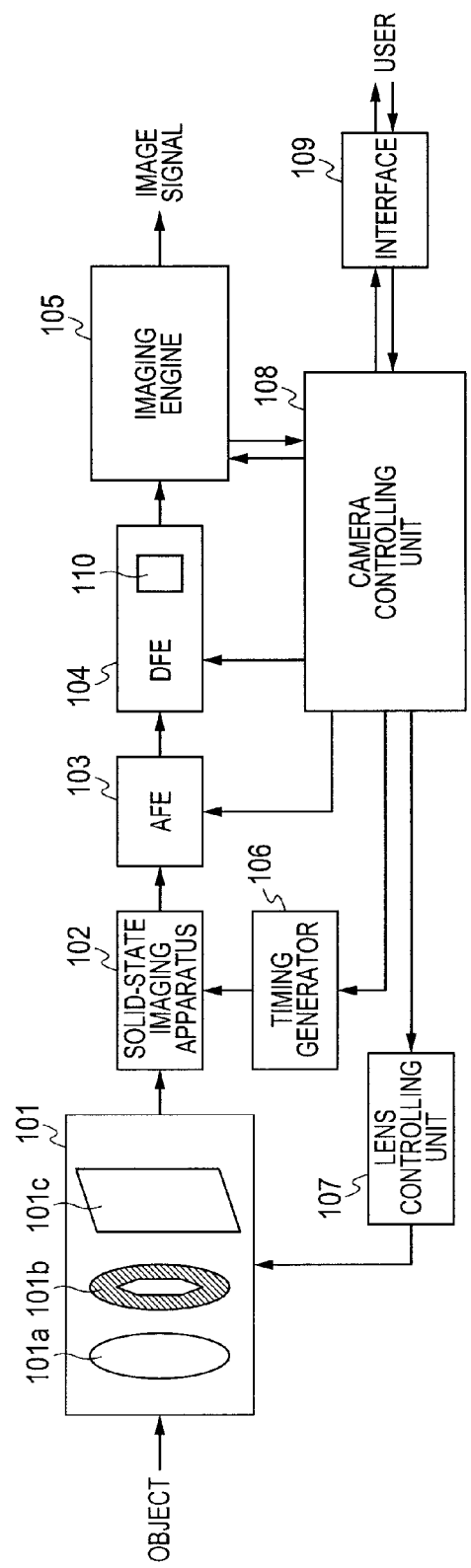

FIG. 2

| B | G1 αR_UL(1) | B αR_UU(1) | G1 αR_UR(1) | B | G2 | B | G2 | B | G2 |
|---|---|---|---|---|---|---|---|---|---|
| G1 | αR_LL(1) G2 | αR(1) R | αR_RR(1) G2 | G1 | R | G1 | R | G1 | R |
| B | αR_BL(1) G2 | αR_BB(1) B | αR_BR(1) G1 | B | G2 | B | G2 | B | G2 |
| G1 | R | G1 | R | G1 | R | G1 | R | G1 | R |
| B | G2 | B αR_UL(0) | B αR_UU(0) | G1 αR_UR(0) | G2 | B | G2 | B | G2 |
| G1 | R | αR_LL(0) G2 | R(0) | αR_RR(0) G2 | R | G1 | R | G1 | R |
| B | G2 | αR_BL(0) B | αR_BB(0) G1 | αR_BR(0) B | G2 | B | G2 | B | G2 |
| G1 | R | G1 | R | G1 | R | G1 | R | G1 | R |
| B | G2 | B | G2 | B | G2 | B | G2 | B | G2 |
| G1 | R | G1 | R | G1 | R | G1 | R | G1 | R |
| B | G2 | B | G2 | B | G2 | B | G2 | B | G2 |

SOLID STATE IMAGING USING A CORRECTION PARAMETER FOR CORRECTING A CROSS TALK BETWEEN ADJACENT PIXELS

BACKGROUND OF THE INVENTION

1. Field of the Invention

The present invention relates to an image processing apparatus and an imaging system.

2. Description of the Related Art

A solid-state imaging apparatus, such as a CMOS image sensor and a CCD image sensor, has a structure in which a color separation filter is laminated over a pixel cell including a photoelectric conversion element, and a condenser lens is further laminated over the color separation filter. In a color solid-state imaging apparatus having the structure, the photoelectric conversion element and the condenser lens are separated by a color filter and a plurality of insulating films. Particularly, a CMOS image sensor includes a plurality of wiring layers on pixels, and the distance between the photoelectric conversion element and the condenser lens is greater than that in the CCD image sensor. Therefore, in a path until light passing through a color filter of a photoelectric conversion element reaches the photoelectric conversion element, components of the light entering adjacent photoelectric conversion elements of other colors cannot be ignored. The components are called a cross talk. The cross talk is not only caused by an optical reason, but, for example, there are components that pass through a photoelectric conversion element of a pixel, and a photoelectric charge leaks to adjacent pixels inside silicon. Even if the light is absorbed by a photoelectric conversion element of a pixel and converted to an electric charge, there are components in which the electric charge diffuses inside the semiconductor and drifts and leaks to adjacent pixels. The components have a characteristic of enlarging as the size of one pixel is reduced. There is a known technique of subtracting a certain ratio of signal components calculated based on signals of pixels that are adjacent to a specific color pixel and that have colors other than the specific color to correct cross talk components by signal processing (Japanese Patent Application Laid-Open No. 2004-135206). There is also a known technique for reducing the cross talk by changing the amount of subtraction according to pixels in different colors in consideration of the asymmetry caused by a layout of wiring of pixels (Japanese Patent Application Laid-Open No. 2007-142697).

The techniques of Japanese Patent Application Laid-Open No. 2004-135206 and Japanese Patent Application Laid-Open No. 2007-142697 effectively function when the pixel size is relatively large. However, if the pixel size is reduced, there would be ununiformity and variation in color mixing (cross talk) quantity depending on the position on the imaging region. Although the incident light perpendicularly enters at the center of the imaging region, the incident light diagonally enters the imaging surface near the edge of the imaging region. The direction and the extent of the inclination also vary depending on the position on the imaging region. The cross talk increases if the pixel size is reduced, and from which color of pixel of up, down, left, and right pixels and how much the cross talk signal is superimposed significantly vary depending on the structure and the layout of the pixels. In Japanese Patent Application Laid-Open No. 2004-135206 and Japanese Patent Application Laid-Open No. 2007-142697, the amount of correction is constant regardless of the position on the imaging region. Therefore, satisfactory correction on all positions on the imaging surface is difficult.

An object of the present invention is to provide an image processing apparatus and an imaging system capable of realizing suitable cross talk correction throughout the entire region of the imaging region.

SUMMARY OF THE INVENTION

An image processing apparatus for a solid-state imaging apparatus according to the present invention comprises a plurality of pixels each including a photoelectric conversion element arranged two dimensionally in a matrix and a color filter of plural colors is arranged over a surface of the pixel, such that the image processing apparatus corrects a cross talk between adjacent pixels of different colors, wherein the image processing apparatus comprises: a memory unit for storing a correction parameter for reduction a cross talk signal leaked to an object pixel from an adjacent pixel, the correction parameter corresponding to a position of the object pixel; and a correcting unit for subtracting, based on the correction parameter stored in the memory unit, the cross talk signal from a pixel signal of the solid-state imaging apparatus correspondingly to a position of the pixel, and wherein a number of the object pixel is at least two, and the at least two object pixels have different addresses in a horizontal direction, and different addresses in a vertical direction.

Further features of the present invention will become apparent from the following description of exemplary embodiments with reference to the attached drawings.

BRIEF DESCRIPTION OF THE DRAWINGS

FIGS. 1A and 1B are block diagrams illustrating an example of configuration of an imaging system and a solid-state imaging apparatus.

FIG. 2 is a diagram illustrating a pixel color array and a cross talk of the solid-state imaging apparatus of a first embodiment.

FIG. 4 is a diagram illustrating a pixel color array and regions for selectively using cross talk correction parameters.

FIGS. 5A and 5B are diagrams illustrating a pixel color array of the solid-state imaging apparatus of a second embodiment.

DESCRIPTION OF THE EMBODIMENTS

Preferred embodiments of the present invention will now be described in detail in accordance with the accompanying drawings.

(First Embodiment)

Figure 1B:
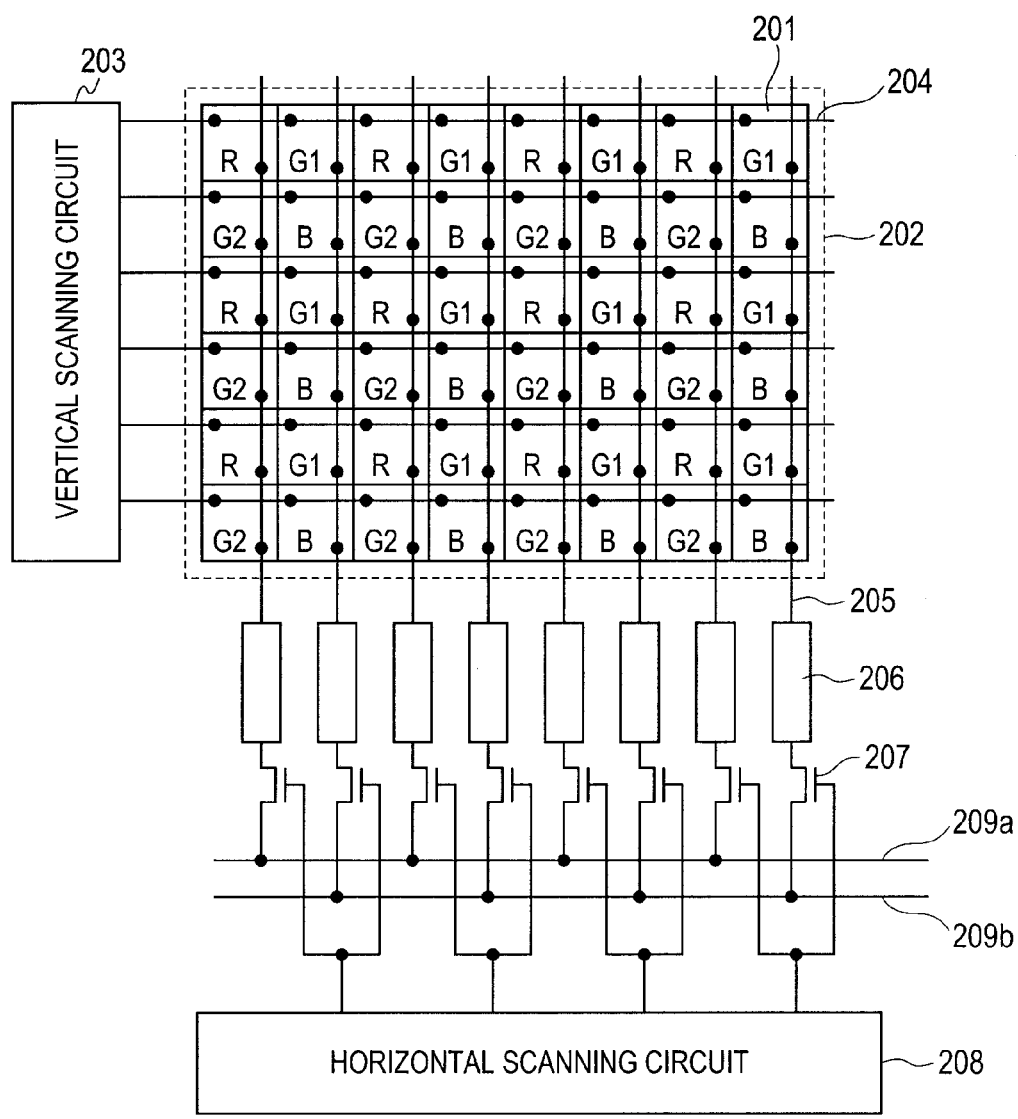

FIG. 1A is a block diagram illustrating an example of configuration of an imaging system according to a first embodiment of the present invention. FIG. 1B is a diagram illustrating an example of configuration of a solid-state imaging apparatus according to the first embodiment of the present invention. The imaging system can be applied to a digital single lens reflex camera, a compact digital camera, a video camera, a digital camera for cell phone, and a digital camera for broadcasting. The configuration of the imaging system of FIG. 1A and the configuration of the solid-state imaging apparatus of FIG. 1B can be commonly applied to all embodiments. In the imaging system of FIG. 1A, the solid-state imaging apparatus is included as, for example, a part of a digital single lens reflex camera. The configuration can be applied not only to the digital signal lens reflex camera, but also to imaging apparatus in general, such as a video camera and a digital compact camera. The imaging system of FIG. 1A includes an optical system 101, a solid-state imaging apparatus 102, an AFE 103, a DFE 104, an imaging engine 105, a timing generator 106, a lens controlling unit 107, a camera controlling unit 108, and an interface 109. The AFE 103 denotes an analog front end, and the DFE 104 denotes a digital front end. The optical system 101 includes a lens 101a that forms an image from incident light of an object on an imaging surface of the solid-state imaging apparatus 102, an aperture 101b that controls the amount of incident light passed through the lens 101a and a shutter 101c, and the shutter 101c that controls the time of the light entering the solid-state imaging apparatus 102. The solid-state imaging apparatus 102 photoelectrically converts the light entered through the optical system 101 pixel by pixel and outputs the light as an electrical signal. A specific configuration of the solid-state imaging apparatus 102 will be described later. The AFE 103, which is an analog signal processing circuit, samples and holds an analog signal output from the solid-state imaging apparatus 102, applies gain adjustment and offset adjustment to the signal, and applies A/D (analog/digital) conversion to the signal. The DFE 104 performs fine adjustment of gain by digital processing, performs fine adjustment of offset, sorts digital signals, and executes a multiplex process of the digital signals. The DFE 104 includes a cross talk correcting apparatus (image processing apparatus) 110. The imaging engine 105 executes a white balance process and other image processing of brightness, contrast, and coloring. The timing generator 106 provides a suitable drive signal to the solid-state imaging apparatus 102 according to an instruction of the camera controlling unit 108. The lens controlling unit 107 adjusts the position of the lens 101a according to an instruction of the camera controlling unit 108 to form an image from the light of the object on the imaging surface of the solid-state imaging apparatus 102 and adjusts the aperture 101b to adjust the depth of field and the brightness. The camera controlling unit 108, which is mainly constituted by a microcomputer in general, detects the imaging mode, the aperture, the shutter speed, and the ISO sensitivity set by the user, controls the optical system 101 through the lens controlling unit 107, and controls the gain by the AFE 103 and the DFE 104. The camera controlling unit 108 controls the accumulation period of the solid-state imaging apparatus 102 through the timing generator 106, controls the gain of the AFE 103 and the DFE 104, and controls the hue in the imaging engine 105. Meanwhile, the camera controlling unit 108 displays a signal of a photographed image on a display apparatus of the user through the interface 109 based on a signal transmitted from the imaging engine 105. The location of the cross talk correcting apparatus 110 is not limited to the DFE 104. The cross talk correcting apparatus 110 may be in the imaging engine 105 or may independently exist.

FIG. 1B is a block diagram of the solid-state imaging apparatus 102 using a CMOS image sensor. The solid-state imaging apparatus 102 includes an imaging region 202 in which a plurality of pixels 201 having photoelectric conversion elements and color filters are two dimensionally arranged. In the imaging region 202, the pixels 201 including photoelectric conversion elements are two dimensionally arranged in a matrix, and color filters of plural colors are arranged on the surface of the pixels 201. A vertical scanning circuit 203 supplies a drive signal for reading out a signal of the pixels 201. A horizontal common control line 204 transfers a drive signal from the vertical scanning circuit 203 to the pixels 201. A vertical common signal line 205 transfers a signal of the pixels 201 to a columnar signal reading circuit 206. The columnar signal reading circuit 206 samples and holds the signal of the pixels 201 after signal processing. A horizontal reading switch 207 receives a horizontal scan signal from a horizontal scanning circuit 208 and transfers the signal sampled and held in the columnar signal reading circuit 206 to horizontal common signal lines 209a and 209b. In an example herein, the solid-state imaging apparatus 102 includes two channels, the horizontal common signal lines 209a and 209b. The horizontal common signal lines may include one or a plurality of channels, and the present embodiment can be applied as long as the pixels 201 having a plurality of color filters are two dimensionally arranged, regardless of the configuration of the columnar signal reading circuit 206.

A correction method when all pixels are correction targets will be illustrated. FIG. 2 illustrates the imaging region 202 of FIG. 1B. Although a case in which three types of color filters: G1 and G2 (green); B (blue); and R (red) are formed on the surface of the pixels 201 is illustrated herein, the present invention can be applied to other configurations. The B and R pixels that are object pixels can be arbitrarily selected on the plane. There are no restrictions on the positional relationship between the B and R pixels. Although the pixel array includes 8 columns and 11 rows for simplification, there are actually several million to tens of millions of pixels. The object pixels as correction targets of cross talk are R in the description. In relation to electric charge generated as light passing through color filters of pixels B on the upper left side of object pixels R leaks to photoelectric converting units of adjacent R, a parameter indicating a ratio of cross talk signals to R signals among the signals that are supposed to be B signals is illustrated as $\alpha R\_UL(0)$. Similarly, in relation to electric charge generated as light passing through color filters of pixels G1 on the upper side leaks to the photoelectric converting units of R, a parameter indicating a ratio of cross talk signals to the R signals among the signals that are supposed to be G1 signals is illustrated as $\alpha R\_UU(0)$. A parameter indicating a ratio of cross talk from the pixels B on the upper right side of the object pixels R is illustrated as $\alpha R\_UR(0)$, and a parameter indicating a ratio of cross talk from the pixels G2 on the right side of the object pixels R is illustrates as $\alpha R\_RR(0)$. A parameter indicating a cross talk ratio from the pixels B on the lower right side of the object pixels R is illustrated as $\alpha R\_BR(0)$, and a parameter indicating a cross talk ratio from the pixels G1 on the lower side of the object pixels R is illustrated as $\alpha R\_BB(0)$. A parameter indicating a cross talk ratio from the pixels B on the lower left side of the object pixels R is illustrated as $\alpha R\_BL(0)$, and a parameter indicating a cross talk ratio from the pixels G2 on the left side of the object pixels R is illustrated as $\alpha R\_LL(0)$. A parameter group different from the object pixels is defined for the object pixels R on the upper right side of the imaging region of FIG. 2. The parameters are indicated by αR_UL(1), αR_UU(1), αR_UR (1), αR_RR(1), αR_BR(1), αR_BB(1), αR_BL(1), and αR_LL(1).

The object pixels are not limited to R, and parameters are also defined as follows for other colors G1, B, and G2. Parameters αG1_UL(n), αG1_UU(n), αG1_UR(n), αG1_RR(n), αG1_BR(n), αG1_BB(n), αG1_BL(n), αG1_LL(n), n=1, 2, 3 . . . are defined for object pixels G1. Parameters αB_UL(n), αB_UU(n), αB_UR(n), αB_RR(n), αB_BR(n), αB_BB(n), αB_BL(n), αB_LL(n), n=1, 2, 3 . . . are defined for object pixels B. Parameters αG2_UL(n), αG2_UU(n), αG2_UR(n), αG2_RR(n), αG2_BR(n), αG2_BB(n), αG2_BL(n), αG2_LL(n), n=1, 2, 3 . . . are defined for object pixels G2.

A correction formula for the object pixels R will be described. In the correction of an R pixel at the imaging region center, a signal output of the pixel R after correction is indicated by R(0)sig', and a signal output of the pixel R before correction is indicated by R(0)sig. Signal outputs before correction are indicated by G1(0)sig, B(0)sig, and G2(0)sig for other pixel signals around the object pixel. The following formula is a formula for correcting the cross talk.

$$R(0)\text{sig}' = R(0)\text{sig} - [B \times \alpha R\_UL(0) + G1 \times \alpha R\_UU(0) + B \times \alpha R\_UR(0) + G2 \times \alpha R\_RR(0) + B \times \alpha R\_BR(0) + G1 \times \alpha R\_BB(0) + B \times \alpha R\_BL(0) + G2 \times \alpha R\_LL(0)] \quad \text{Expression (1.1)}$$

If the object pixel is G1(0), the following is the correction formula.

$$G1(0)\text{sig}' = G1(0)\text{sig} - [G2 \times \alpha G1\_UL(0) + R \times \alpha G1\_UU(0) + G2 \times \alpha G1\_UR(0) + B \times \alpha G1\_RR(0) + G2 \times \alpha G1\_BR(0) + R \times \alpha G1\_BB(0) + G2 \times \alpha G1\_BL(0) + B \times \alpha G1\_LL(0)] \quad \text{Expression (1.2)}$$

If the object pixel is B(0), the following is the correction formula.

$$B(0)\text{sig}' = B(0)\text{sig} - [R \times \alpha B\_UL(0) + G2 \times \alpha B\_UU(0) + R \times \alpha B\_UR(0) + G1 \times \alpha B\_RR(0) + R \times \alpha B\_BR(0) + G2 \times \alpha B\_BB(0) + R \times \alpha B\_BL(0) + G1 \times \alpha B\_LL(0)] \quad \text{Expression (1.3)}$$

If the object pixel is G2(0), the following is the correction formula.

$$G2(0)\text{sig}' = G2(0)\text{sig} - [G1 \times \alpha G2\_UL(0) + B \times \alpha G2\_UU(0) + G1 \times \alpha G2\_UR(0) + R \times \alpha G2\_RR(0) + G1 \times \alpha G2\_BR(0) + B \times \alpha G2\_BB(0) + G1 \times \alpha G2\_BL(0) + R \times \alpha G2\_LL(0)] \quad \text{Expression (1.4)}$$

Although the parameters change in the pixels 201 on the imaging region 202, the relationship of calculation between the object pixels and the surrounding pixels do not change.

Figure 3:
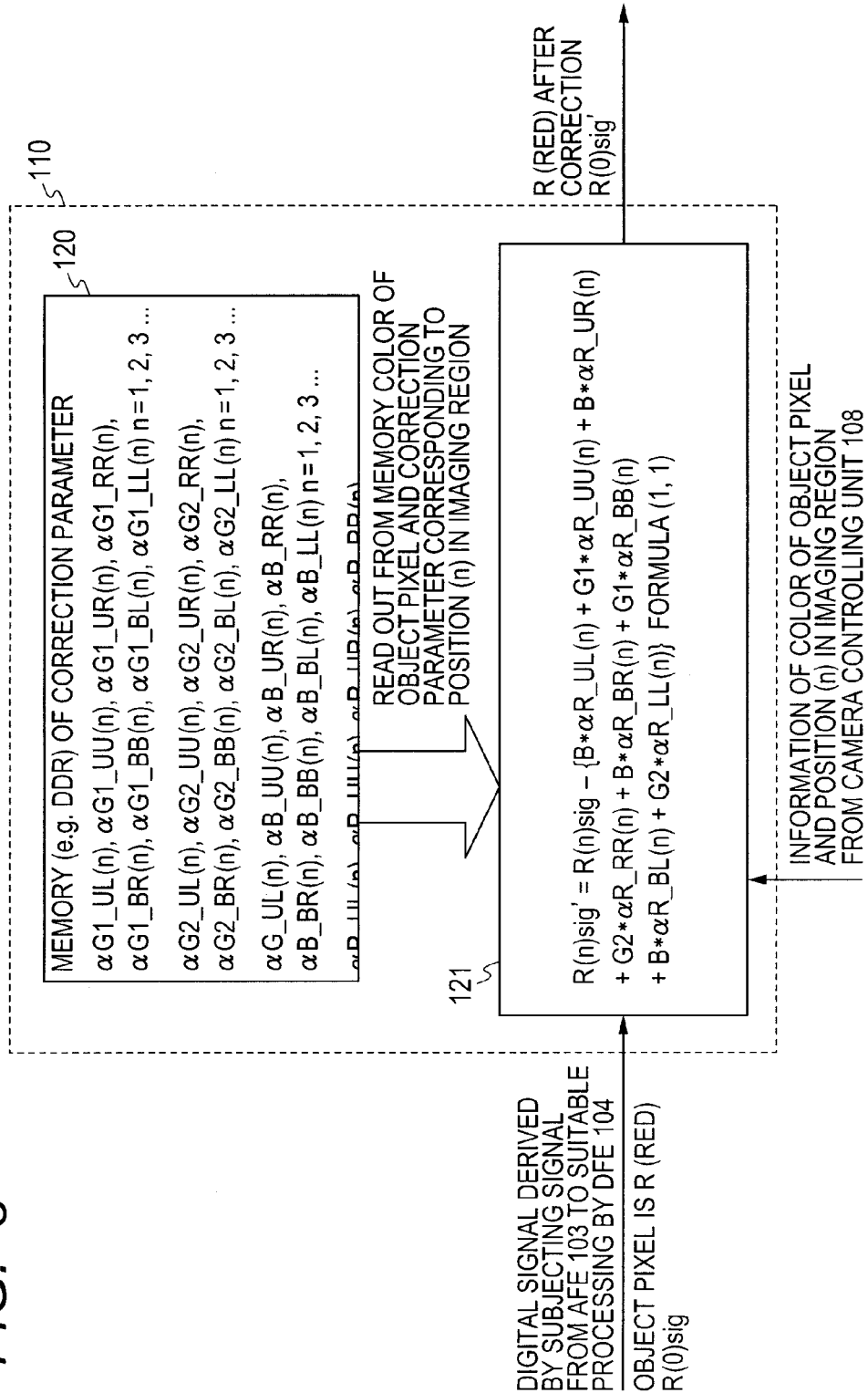
FIG. 3 is a diagram illustrating a summary of a cross talk correcting apparatus of the first embodiment.

FIG. 3 illustrates an example of configuration of the cross talk correcting apparatus 110 of FIG. 1A. The cross talk correcting apparatus 110 includes: a memory 120 as a memory unit of the cross talk correction parameters; and a correcting unit 121, and corrects a cross talk between adjacent pixels of the solid-state imaging apparatus 102. The memory 120 may be in the cross talk correcting apparatus 110 or may be outside the cross talk correcting apparatus 110. A digital signal derived by suitable processing by the DFE 104 to a signal received from the AFE 103 serves as an object pixel to be corrected. The correcting unit 121 receives color information of object pixels and position information (n here) of the imaging region 202 from the camera controlling unit 108, reads out corresponding correction parameters from the memory 120, and executes a calculation process based on Expressions (1.1) to (1.4). As for the correction parameters, for example, the parameters from upper left (UL) may not be the same if the color relationship between the object pixels and the surrounding pixel is different. For example, αR_UL (n)≠αG1_UL(n). This is because since the wavelength of the light entering the photoelectric conversion element varies due to differences in color of the color filters, the depth of the silicon single crystal converted to electric charge varies. For example, if light with short wavelength of the pixel B (blue) on the upper left (UL) side of the pixel R as an object pixel is photoelectrically converted at a shallow position from the silicon semiconductor surface, electric charge is easily collected on the photodiode (photoelectric conversion element) of the pixel B. Therefore, the probability that the electric charge is collected on the photodiode of an adjacent pixel is low. More specifically, most of the light with short wavelength is photoelectrically converted at a shallow position from the silicon semiconductor surface, and the probability that the light passes through the photoelectric conversion element and reaches an adjacent pixel is low. On the other hand, the probability that light with long wavelength of the pixel R (red) on the upper left (UL) side of the pixel B as an object pixel passes through the photoelectric conversion element of the pixel B and that the photoelectric conversion element of an adjacent pixel with different color captures the light is higher than the probability in the light with short wavelength. More specifically, most of the light with long wavelength is photoelectrically converted at a deep position from the silicon semiconductor surface, and the probability that the light leaks to an adjacent pixel is higher than the probability in the light with short wavelength. For this reason, for example, the parameters from upper left (UL) may not be the same if the color relationship between the object pixels and the surrounding pixels is different. The example illustrates a case in which only the color filters are different in the pixels B and the pixels R under the condition that the configurations other than the color filters are the same or equivalent. If pixel configurations other than the color filters, such as the layout and the device structure of the photoelectric conversion element, are different, the magnitude correlation between the wavelength and the cross talk of adjacent pixels may vary. The incidence angle of light relative to the pixels increases from the center of the imaging region 202 to the periphery of the imaging region 202. Therefore, between the pixel R(0) of the center region and the pixel R(1) of the peripheral region of the imaging region 202, the light passing through the color filter or the photoelectrically converted charge easily enters the adjacent pixels G1, B, and G2 in the pixel R(1) of the peripheral region. Therefore, the extent of cross talk is worsened compared to pixel having other color filters.

Figure 4:
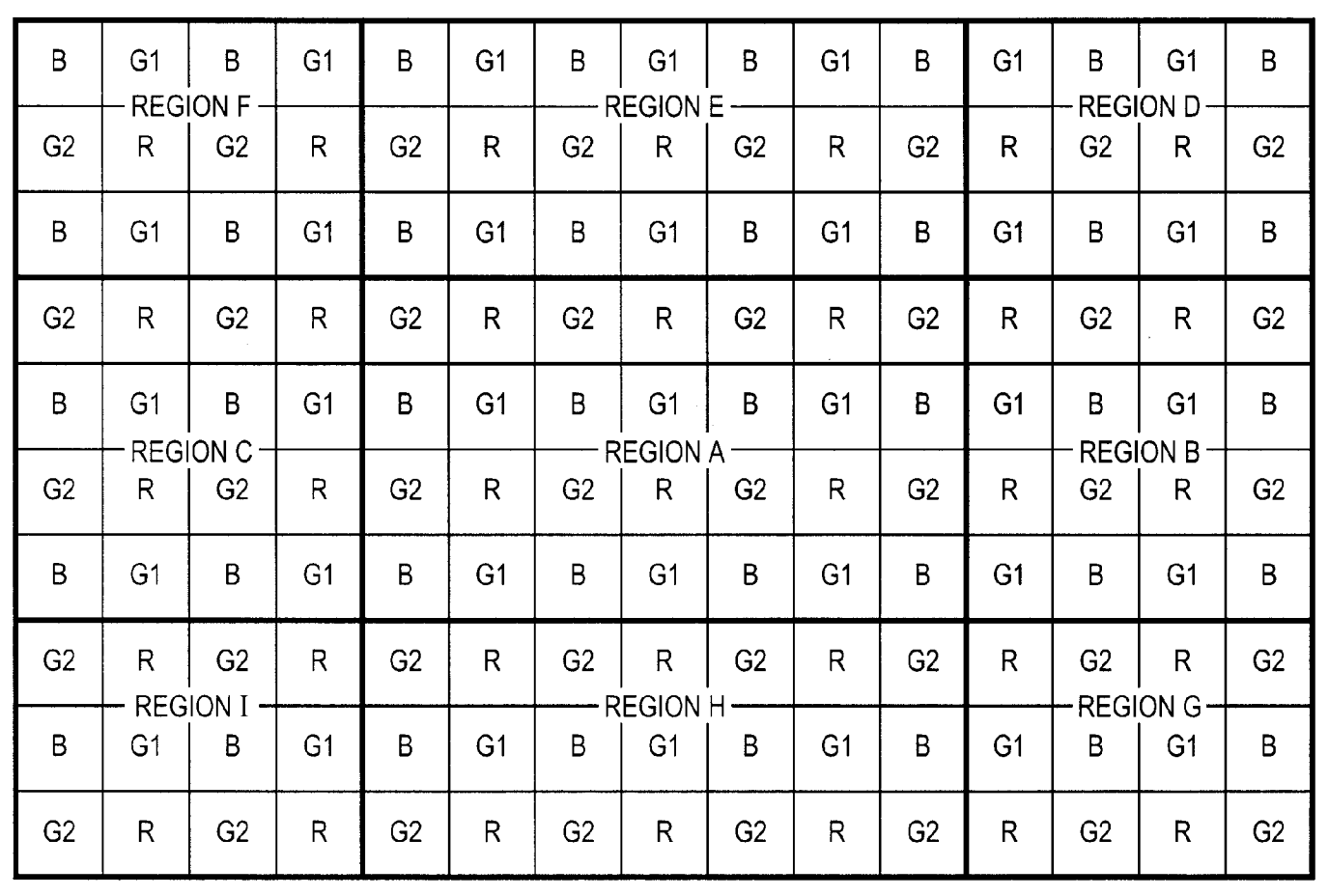

As described, the cross talk correcting apparatus 110 includes the memory 120 and the correcting unit 121. The memory 120 stores correction parameters that are for removing cross talk signals leaking to object pixels from adjacent pixels and that correspond to the positions of the object pixels. The correcting unit 121 uses the correction parameters stored in the memory 120 to subtract the cross talk signals from the pixel signals of the solid-state imaging apparatus 102 according to the positions of the pixels. In the present embodiment, the cross talk correction parameters of the center region and the peripheral region of the imaging region 202 can be selectively used to accurately correct the cross talk throughout the entire region of the imaging region 202. The correction parameters of the pixels at the center region and the correction parameters of the pixels at the peripheral region are different. Considering the time required for the correction process, the imaging region 202 may be divided into some regions A to I as in FIG. 4, and the cross talk correction parameters may be shared within the same regions. The memory 120 stores correction parameters of the regions that are divided into a plurality of regions A to I from the region 202 of the pixels. The correcting unit 121 uses the correction parameters of the regions that the pixels belong to in order to subtract the cross talk signals from the pixel signals of the solid-state imaging apparatus 102. The object pixels two dimensionally exist in the pixels two dimensionally arranged in a matrix. There are at least two object pixels, and both addresses in the horizontal direction and the vertical direction of the at least two object pixels are different. The division of the imaging region of FIG. 4 is not limited to this. Although the correction process is applied to eight surrounding pixels of the object pixel, the correction process using the cross talk correction parameters of upper left, upper right, lower left, and lower right with relatively less cross talk may be skipped according to the image quality required by an application. The length in the oblique direction is $\sqrt{2}$ times longer than the distance between pixels in the vertical or horizontal direction, and the extent of the cross talk is less. To further prioritize the image quality, parameters of further outer surrounding pixels may be used to execute the cross talk correction process. If there is not much time for signal processing due to a high frame rate such as in moving image photographing, for example, a method of skipping the cross talk correction process in the oblique direction of the object pixels or a method of dividing the imaging region 202 into a plurality of regions as described above is implemented. The incidence angle of light beam entering the solid-state imaging apparatus 102 varies according to the aperture 101b of the optical system 101. Therefore, the correction of cross talk is more effective if the cross talk correction parameters are selectively used for the correction according to the aperture 101b. The incidence angle of light beam entering the solid-state imaging apparatus 102 varies according to the lens pupil distance. Therefore, the correction of cross talk is more effective if the cross talk correction parameters are selectively used for the correction according to the pupil distance. The configuration of the cross talk correcting apparatus 110 in this case is the same as in FIG. 3, and the difference is that the memory 120 in the cross talk correcting apparatus 110 includes correction parameters according to the pupil distance and the aperture value of the optical system 101. The correcting unit 121 receives information of the pupil distance and the aperture value of the optical system 101 from the camera controlling unit 108, reads out the correction parameters corresponding to the information from the memory 120, and executes a calculation process based on Expressions (1.1), (1.2), (1.3), and (1.4). More specifically, the correcting unit 121 subtracts the cross talk signals from the pixel signals of the solid-state imaging apparatus 102 according to the aperture value and/or the pupil distance of the optical system 101 used for the solid-state imaging apparatus 102.

(Second Embodiment)

Figure 5A:
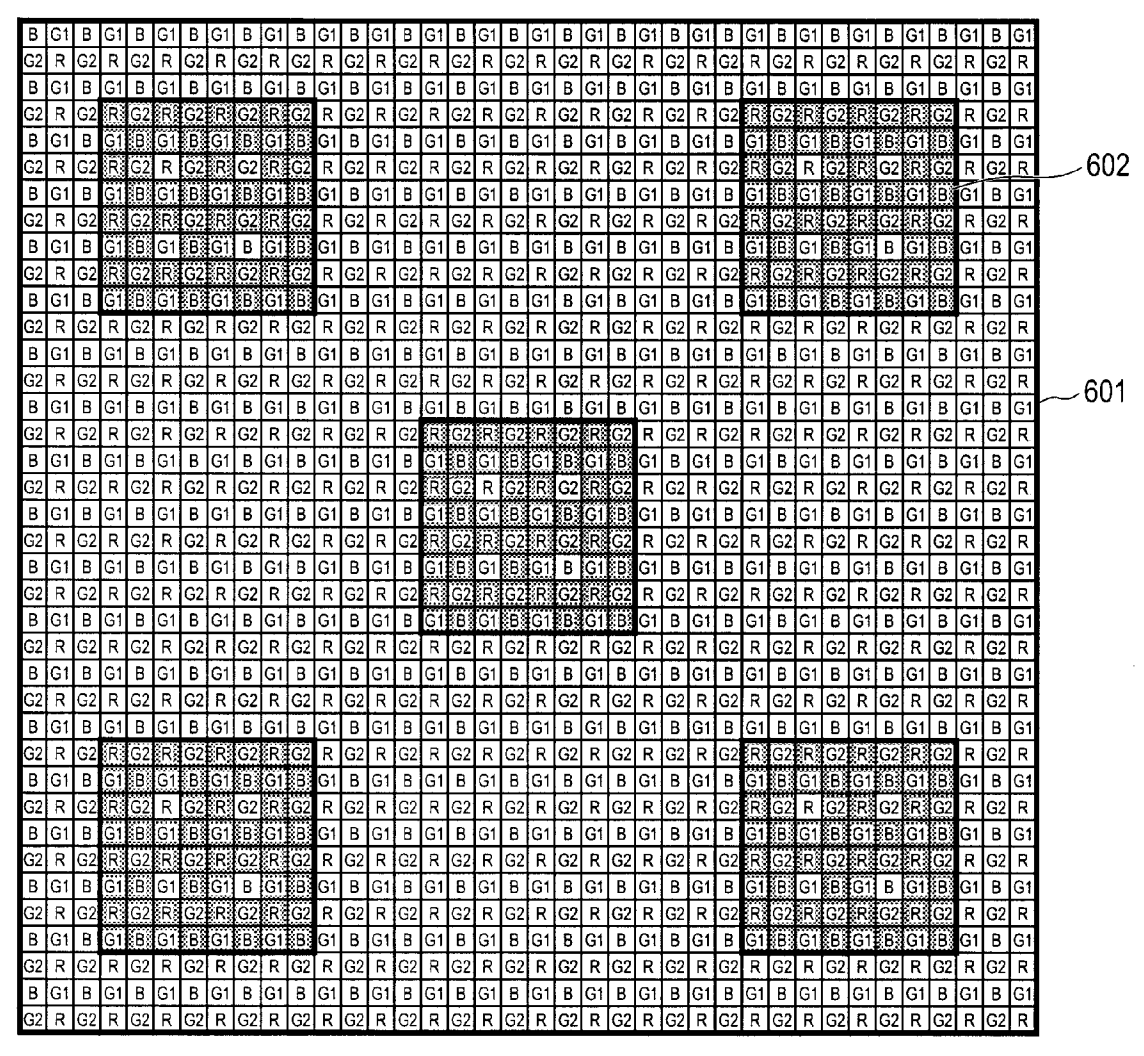
Figure 5B:
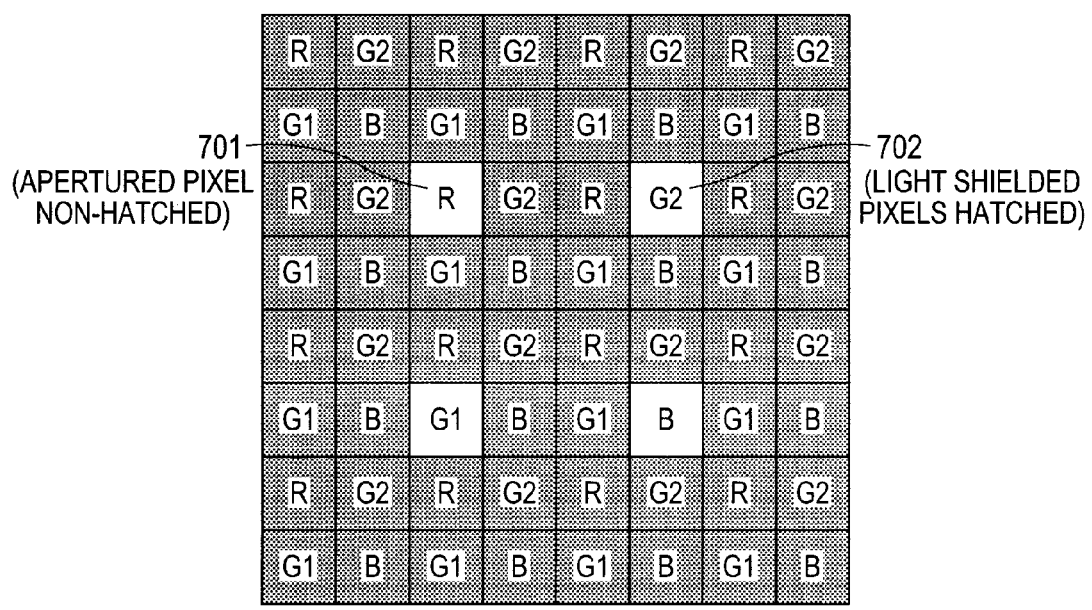

FIGS. 5A and 5B are diagrams illustrating a color arrangement of the solid-state imaging apparatus of a second embodiment of the present invention. Light shielded pixel regions 602 are provided at a plurality of parts in an imaging region 601. Light shielded pixels are pixels including a metal layer, etc. for shielding light in order to prevent light from entering the photoelectric conversion elements. Forming the color filters by a light shielding material can also provide the light shielded pixels. The present embodiment illustrates an example of the solid-state imaging apparatus 102 having a structure, in which aperture pixels surrounded by the light shielded pixels are formed on the solid-state imaging apparatus 102, and signals of the aperture pixels can be evaluated to evaluate the amount of cross talk. As illustrated in FIG. 5B, details of the light shielded pixel region 602 indicate that surrounding pixels of one aperture pixel (non-hatched portion) 701 is surrounded by light shielded pixels (hatched portions) 702. An aperture pixel R701 photoelectrically converts the incident light from the object. The light passed through the color filter of the aperture pixel R or the photoelectrically converted electric charge leaks to the surrounding pixels of the aperture pixel R701 as a cross talk. A ratio of a signal B sig of a cross talk signal B that appears on the upper left light shielded pixel B and a signal R sig of the aperture pixel R, i.e. $\alpha B\_BR(n)$, can be obtained. Similarly, $\alpha G1\_BB(n)$, $\alpha B\_BL(n)$, $\alpha G2\_LL(n)$, $\alpha B\_UL(n)$, $\alpha G1\_UU(n)$, $\alpha B\_UR(n)$, and $\alpha G2\_RR(n)$ can be calculated for other surrounding light shielded pixels of the aperture pixel R with the same method. In this case, n=1, 2, 3 .... As for the surrounding pixels of an aperture pixel G2, $\alpha G1\_BR(n)$, $\alpha B\_BB(n)$, $\alpha G1\_BL(n)$, $\alpha R\_LL(n)$, $\alpha G1\_UL(n)$, $\alpha B\_UU(n)$, $\alpha G1\_UR(n)$, and $\alpha R\_RR(n)$ can be calculated. Similarly, $\alpha R\_BR(n)$, $\alpha G2\_BB(n)$, $\alpha R\_BL(n)$, $\alpha G1\_LL(n)$, $\alpha R\_UL(n)$, $\alpha G2\_UU(n)$, $\alpha R\_UR(n)$, and $\alpha G1\_RR(n)$ can be calculated for the aperture pixel B. As for the aperture pixel G2, $\alpha G2\_BR(n)$, $\alpha R\_BB(n)$, $\alpha G2\_BL(n)$, $\alpha B\_LL(n)$, $\alpha G2\_UL(n)$, $\alpha R\_UU(n)$, $\alpha G2\_UR(n)$, and $\alpha B\_RR(n)$ can be calculated. The correction parameters are obtained at each of the light shielded pixel regions 602 arranged at a plurality of parts in FIG. 5A. To correct a cross talk of a pixel, for example, a parameter at the nearest position among several aperture pixels in which the correction parameters are calculated is used. Expressions (1.1), (1.2), (1.3), and (1.4) described in the first embodiment are used to execute a correction process of cross talk.

Figure 6:
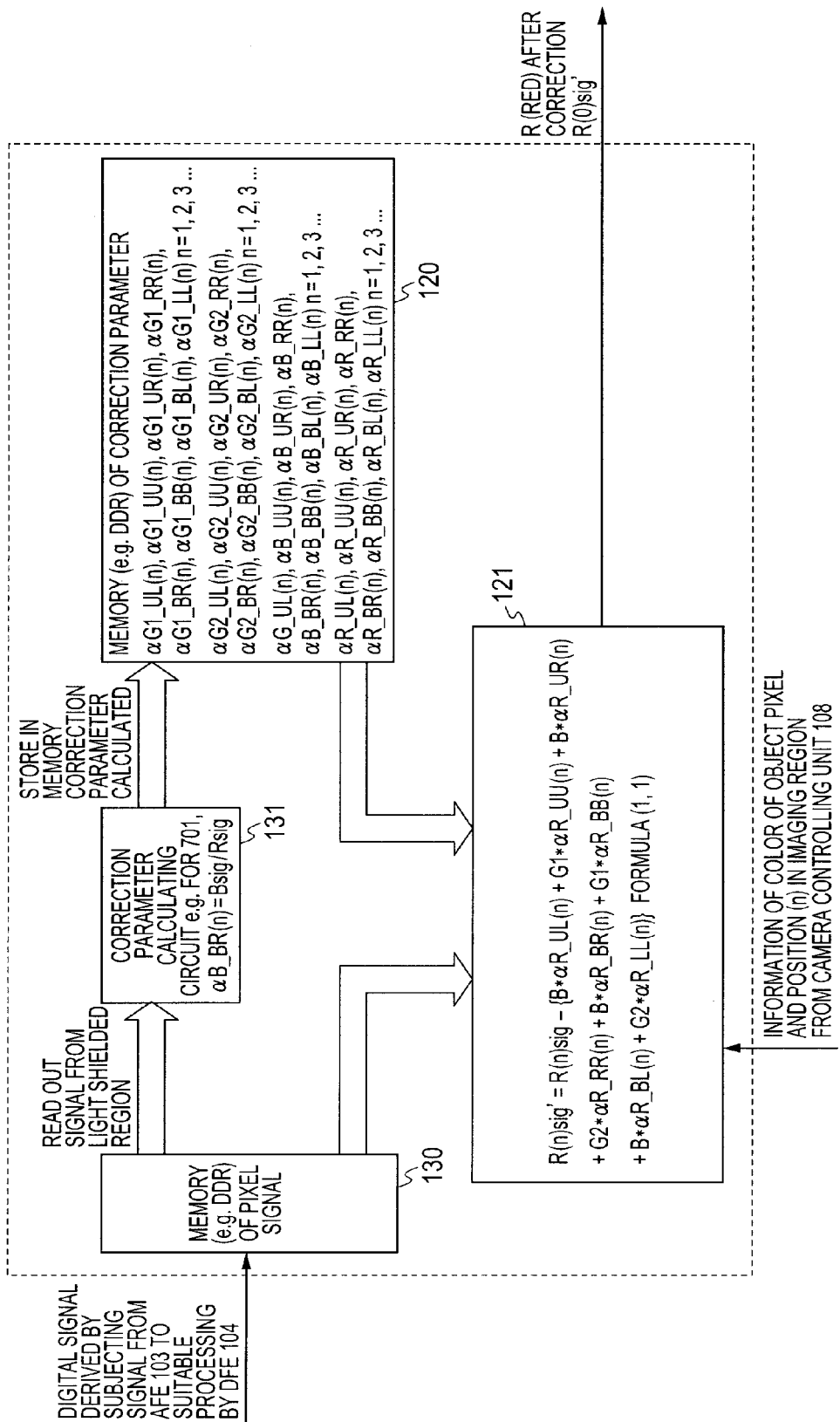
FIG. 6 is a diagram illustrating a summary of the cross talk correcting apparatus of the second embodiment.

FIG. 6 illustrates an example of configuration of the cross talk correcting apparatus 110 of the present embodiment. The cross talk correcting apparatus 110 includes the memory 120 that is a memory unit of the cross talk correction parameters, the correcting unit 121, a memory 130 that temporarily stores pixel signals of each imaging, and a calculating unit 131 that calculates correction parameters. The memories 120 and 130 may be in the cross talk correcting apparatus 110 or may be outside the cross talk correcting apparatus 110. The DFE 104 processes a signal received from the AFE 103. The memory 130 stores digital signals processed by the DFE 104. The correction parameter calculating unit 131 reads out signals of the light shielded pixel regions 602 from the memory 130 to calculate correction parameters. For example, the correction parameter calculating unit 131 calculates a correction parameter $\alpha B\_BR(n)$ based on $\alpha B\_BR(n)$=B sig/R sig. The calculated parameter is stored in the memory 120. The correcting unit 121 reads out the pixel signals from the memory 130 and the correction parameters from the memory 120 to execute a calculation process based on Expressions (1.1), (1.2), (1.3), and (1.4). More specifically, the solid-state imaging apparatus 102 includes aperture pixels and light shielded pixels adjacent to the aperture pixels. The correction parameter calculating unit 131 calculates the correction parameters based on signals of the aperture pixels and signals of the light shielded pixels and stores the correction parameters in the memory 120. The memory 120 stores the correction parameters at a plurality of positions of the pixels. The correcting unit 121 uses the correction parameter at the nearest position of the pixel to subtract the cross talk signal from the pixel signal of the solid-state imaging apparatus 102.

In the present embodiment, the correction parameters can be obtained in real time from the photographed image of the object by arranging a plurality of light shielded pixel regions 602 in the imaging region 601. Therefore, this allows obtaining correction parameters for the cross talk which changes as the incidence angle of light to the solid-state imaging apparatus changes according to the aperture 101b of the optical system 101 and the pupil distance of the optical system 101. As a result, the accuracy of the cross talk correction can be improved. Pixel signals near the light shield regions 602 are used to correct or substitute for the imaging signals of the light shielded pixel regions 602 in the imaging region 601. A plurality of amounts of cross talk obtained from a plurality of light shielded pixel regions 602 are used to calculate the correction of the pixels of the imaging region 601. There are several methods for calculating the amount of cross talk. A first method is a method of using an amount of cross talk of the nearest pixel on the plane for the correction. A second method is a method of dividing the pixels into some regions to use the same cross talk parameters in the regions. A third method is a method of obtaining a change in the amount of cross talk per pixel in the x and y directions from a plurality of light shielded pixel regions 602 to calculate the amount of cross talk according to the position of the pixel.

(Third Embodiment)

Figure 7:
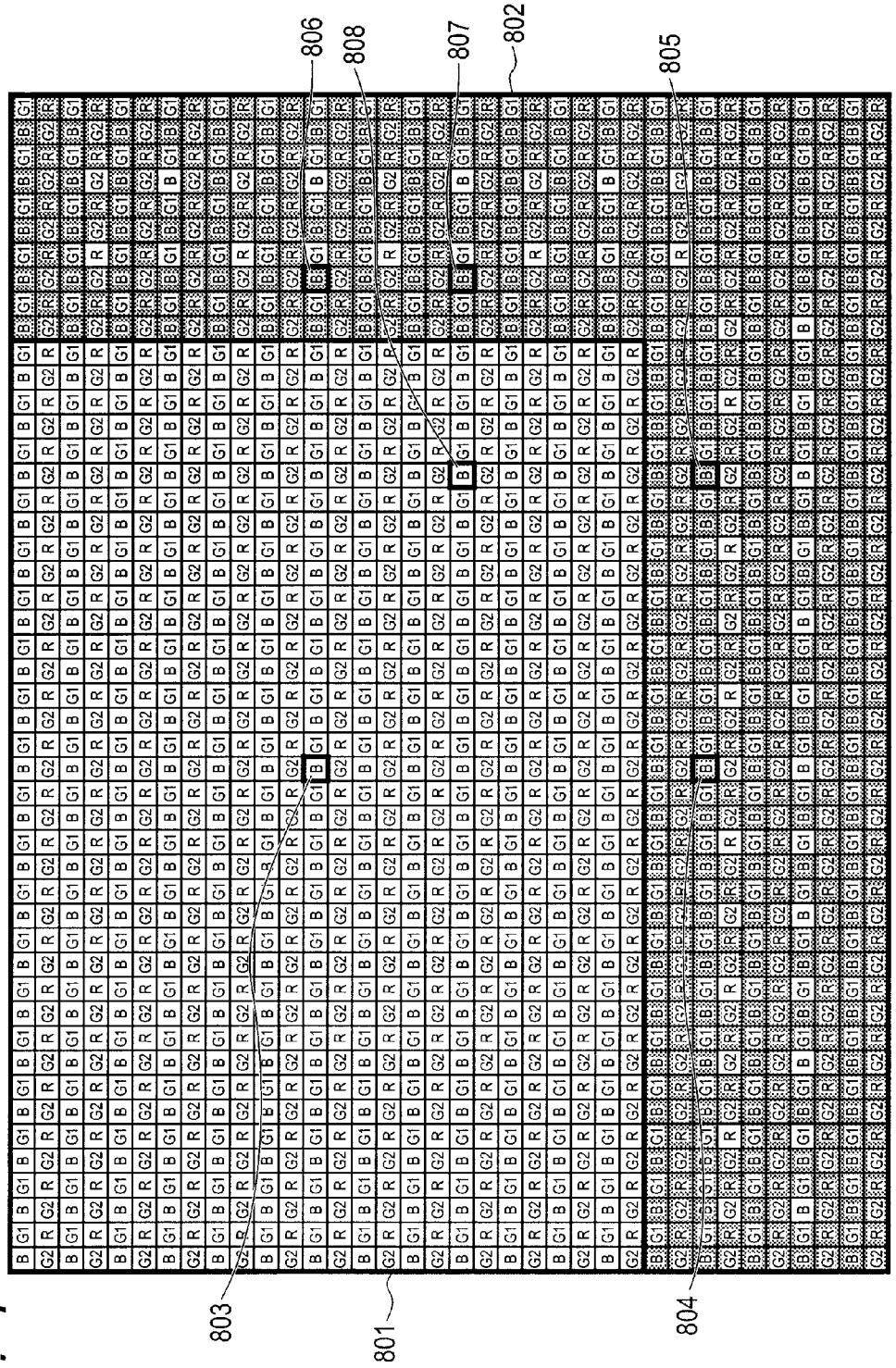
FIG. 7 is a diagram illustrating a pixel color array of the solid-state imaging apparatus of a third embodiment.
Figure 8:
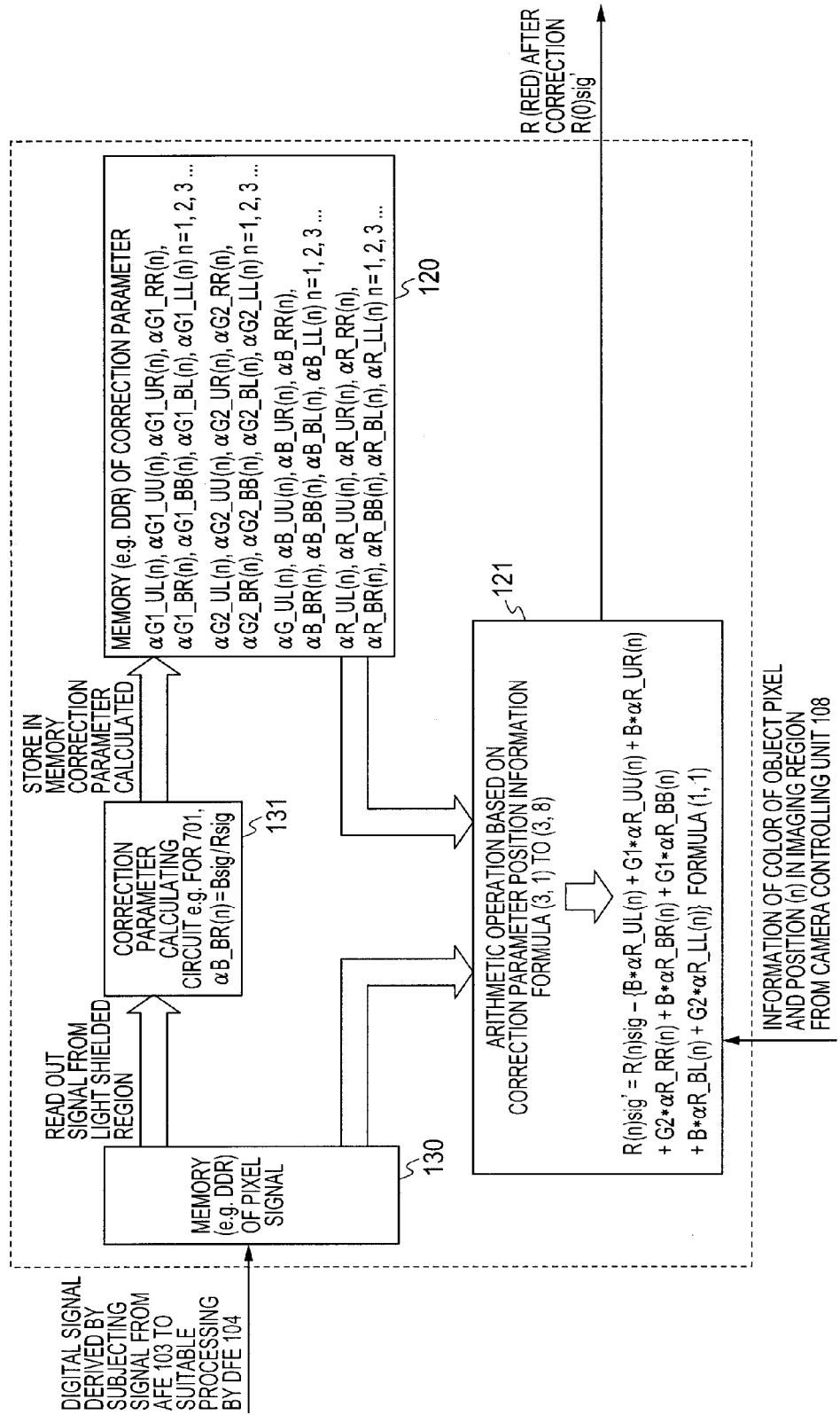
FIG. 8 is a diagram illustrating a summary of the cross talk correcting apparatus of the third embodiment.

FIG. 7 illustrates a pixel array including an imaging region of the solid-state imaging apparatus of a third embodiment of the present invention, and FIG. 8 is a diagram illustrating an example of configuration of the cross talk correcting apparatus 110 of the present embodiment. The different points of the present invention from the second embodiment will be described. The pixel array is constituted by an imaging region 801 and light shielded pixel regions 802, and a light shielded pixel is not arranged in the imaging region 801. In the present embodiment, a plurality of cross talk parameters arranged in the light shielded pixel regions 802 are used to calculate, by a linear interpolation method, the amount of correction of the pixels in the imaging region 801. An example of a calculation method of the cross talk correction parameters and a cross talk correction process of the present embodiment will be described. The cross talk correction parameters when a pixel B(0)803 at the center region of the imaging region 801 is an object pixel are indicated by αB_UL(0), αB_UU(0), αB_UR(0), αB_RR(0), αB_BR(0), αB_BB(0), αB_BL(0), and αB_LL(0). The parameters are calculated in advance by an experiment or simulation. Similarly, the cross talk correction parameters obtained from a pixel B(1)804 in the light shielded pixel regions 802 are indicated by αB_UL(1), αB_UU(1), αB_UR(1), αB_RR(1), αB_BR(1), αB_BB(1), αB_BL(1), and αB_LL(1).

Similarly, for a pixel B(2)804, αB_UL(2), αB_UU(2), αB_UR(2), αB_RR(2), αB_BR(2), αB_BB(2), αB_BL(2), and αB_LL(2) are set. Similarly, for a pixel B(3)805, αB_UL(3), αB_UU(3), αB_UR(3), αB_RR(3), αB_BR(3), αB_BB(3), αB_BL(3), and αB_LL(3) are set. Similarly, for a pixel B(4)806, αB_UL(4), αB_UU(4), αB_UR(4), αB_RR(4), αB_BR(4), αB_BB(4), αB_BL(4), and αB_LL(4) are set. Similarly, for a pixel B(5) 807, αB_UL(5), αB_UU(5), αB_UR(5), αB_RR(5), αB_BR(5), αB_BB(5), αB_BL(5), and αB_LL(5) are set. Similarly, for a pixel B(6)808, αB_UL(6), αB_UU(6), αB_UR(6), αB_RR(6), αB_BR(6), αB_BB(6), αB_BL(6), and αB_LL(6) are set.

If the difference in the position coordinates between the center pixel B(0)803 and the pixel B(6)808 is (X, Y), the difference in the position coordinates between the light shielded pixel B(2)804 and the light shielded pixel (3)B805 is (X, 0), and the difference in the position coordinates between the light shielded pixel B(4)806 and the light shielded pixel B(5)807 is (0, Y). Since the incidence angle of light changes substantially proportionately to the position coordinates, it can be approximated that the difference in a horizontal direction X between the cross talk parameters of the aperture pixel B(6)808 and the aperture pixel B(0)803 is equal to the difference between the cross talk parameters of the light shielded pixels 805 and 804. Similarly, it can be approximated that the difference in a vertical direction Y between the cross talk parameters of the aperture pixel B(6)808 and the aperture pixel B(0)803 is equal to the difference between the cross talk parameters of the light shielded pixels 807 and 806. Consequently, the correcting unit 121 calculates the correction parameters of the pixel B(5)808 by the following Expressions (3.1) to (3.8).

$$\alpha B\_UL(6)=\alpha B\_UL(0)+[\alpha B\_UL(3)-\alpha B\_UL(2)]+[\alpha B\_UL(5)-\alpha B\_UL(4)]$$

$$\alpha B\_UU(6)=\alpha B\_UU(0)+[\alpha B\_UU(3)-\alpha B\_UU(2)]+[\alpha B\_UU(5)-\alpha B\_UU(4)]$$

$$\alpha B\_UR(6)=\alpha B\_UR(0)+[\alpha B\_UR(3)-\alpha B\_UR(2)]+[\alpha B\_UR(5)-\alpha B\_UR(4)]$$

$$\alpha B\_RR(6)=\alpha B\_RR(0)+[\alpha B\_RR(3)-\alpha B\_RR(2)]+[\alpha B\_RR(5)-\alpha B\_RR(4)]$$

$$\alpha B\_BR(6)=\alpha B\_BR(0)+[\alpha B\_BR(3)-\alpha B\_BR(2)]+[\alpha B\_BR(5)-\alpha B\_BR(4)]$$

$$\alpha B\_BB(6)=\alpha B\_BB(0)+[\alpha B\_BB(3)-\alpha B\_BB(2)]+[\alpha B\_BB(5)-\alpha B\_BB(4)]$$

$$\alpha B\_BL(6)=\alpha B\_BL(0)+[\alpha B\_BL(3)-\alpha B\_BL(2)]+[\alpha B\_BL(5)-\alpha B\_BL(4)]$$

$$\alpha B\_LL(6)=\alpha B\_LL(0)+[\alpha B\_LL(3)-\alpha B\_LL(2)]+[\alpha B\_LL(5)-\alpha B\_LL(4)] \quad \text{Expressions (3.1) to (3.8)}$$

Figure 9A:
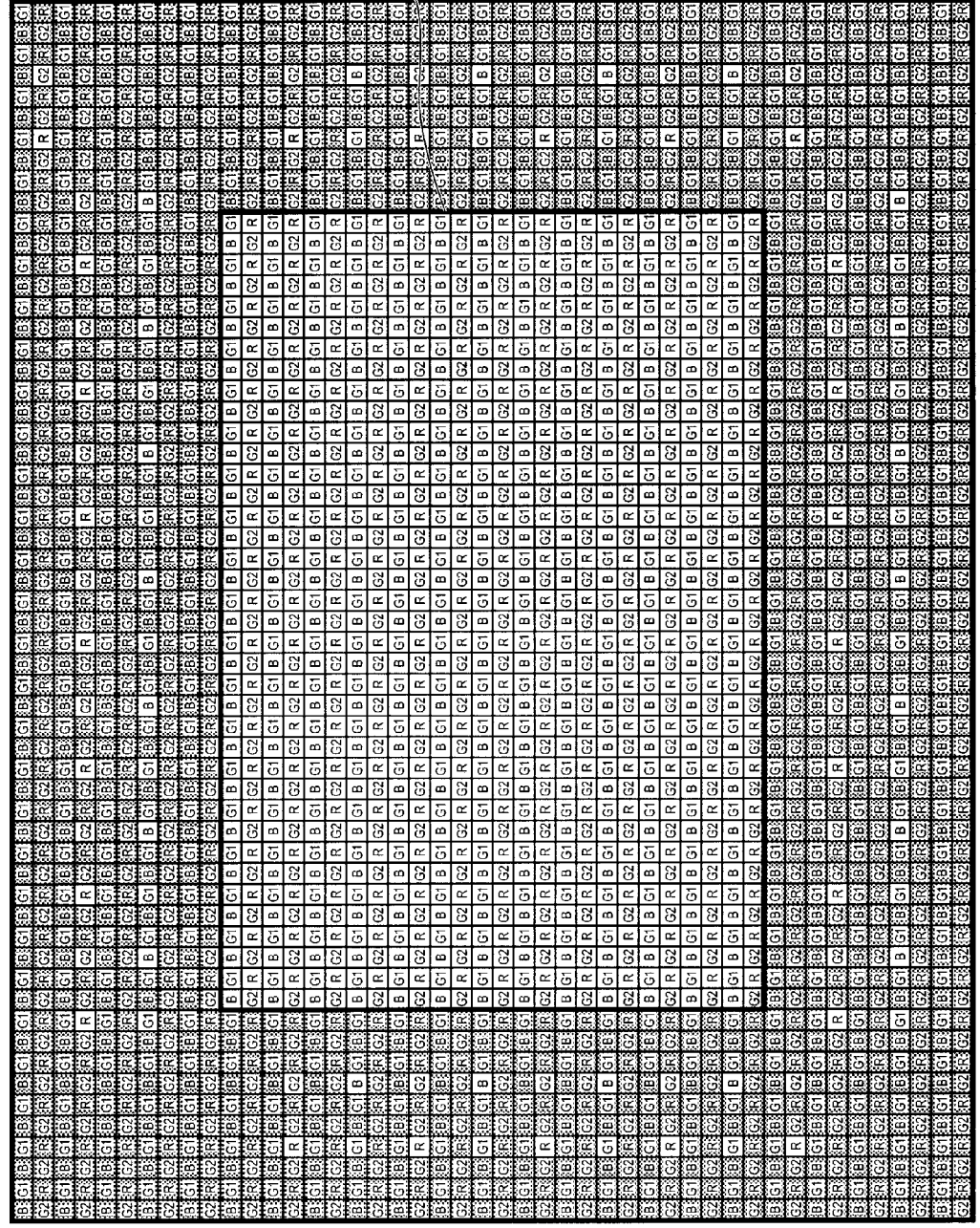
FIGS. 9A and 9B are diagrams illustrating another example of a pixel color array of the solid-state imaging apparatus.
Figure 9B:
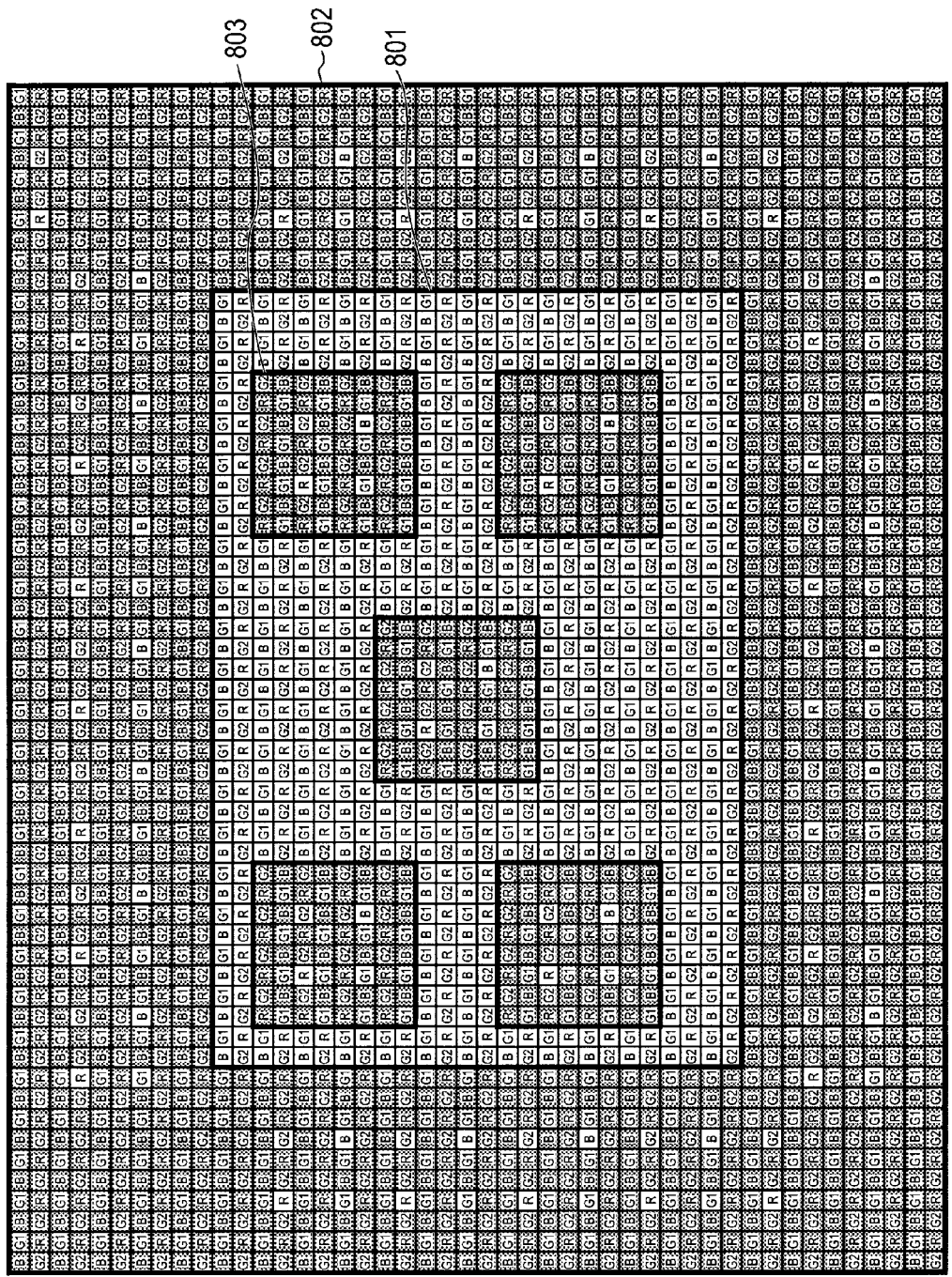

Similarly, the correcting unit 121 uses the cross talk parameters of the light shielded pixel regions 802 to calculate the cross talk correction parameters for other aperture pixels. The correcting unit 121 then uses the calculated cross talk parameters and uses Expressions (1.1), (1.2), (1.3), and (1.4) described in the first embodiment to execute a correction process of cross talk. More specifically, the solid-state imaging apparatus 102 includes a first aperture pixel 803, a second aperture pixel 808, a first light shielded pixel 806, a second light shielded pixel 804, a third light shielded pixel 807, and a fourth light shielded pixel 805. The first light shielded pixel 806 is a light shielded pixel in the same row as the first aperture pixel 803. The second light shielded pixel 804 is a light shielded pixel in the same column as the first aperture pixel 803. The third light shielded pixel 807 is a light shielded pixel in the same row as the second aperture pixel 808. The fourth light shielded pixel 805 is a light shielded pixel in the same column as the second aperture pixel 808. The memory 120 stores the correction parameters of the first aperture pixel 803 and the correction parameters of the first to fourth shielded pixels 806, 804, 807, and 805. The correcting unit 121 calculates the correction parameters of the second aperture pixel 808 based on the correction parameters of the first aperture pixel 803 and the correction parameters of the first to fourth shielded pixels 806, 804, 807, and 805. The correcting unit 121 then uses the correction parameters of the second aperture pixel 808 to subtract the cross talk signal from the signal of the second aperture pixel 808. As a result, the cross talk can be reduced throughout the entire region of the imaging region 801 in the present embodiment without arranging the light shielded pixel regions in the imaging region 801. Furthermore, as illustrated in FIG. 9A, it is more suitable that the accuracy of the correction parameter calculation improves by providing the light shielded pixel regions 802 at four sides of the imaging region 801 and using the average of the correction parameters obtained from two light shielded pixel regions 802 located in parallel. As illustrated in FIG. 9B, it is more suitable if the accuracy of the correction parameter calculation improves by a hybrid type in which, the light shielded pixel regions 803 are provided in the imaging region 801, and the light shielded pixel regions 802 are provided around the imaging region 801.

(Fourth Embodiment)

Figure 10A:
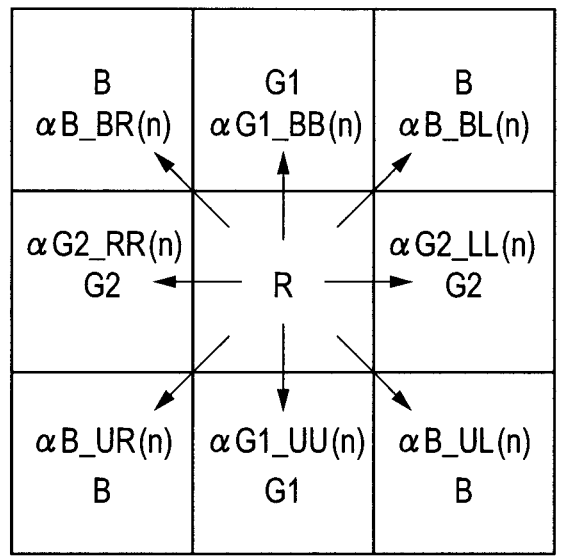
FIGS. 10A and 10B are diagrams illustrating a pixel color array of the solid-state imaging apparatus of a fourth embodiment.
Figure 10B:
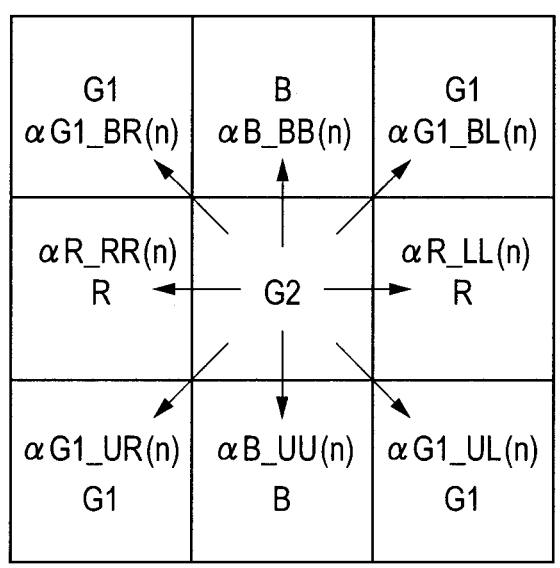
Figure 11:
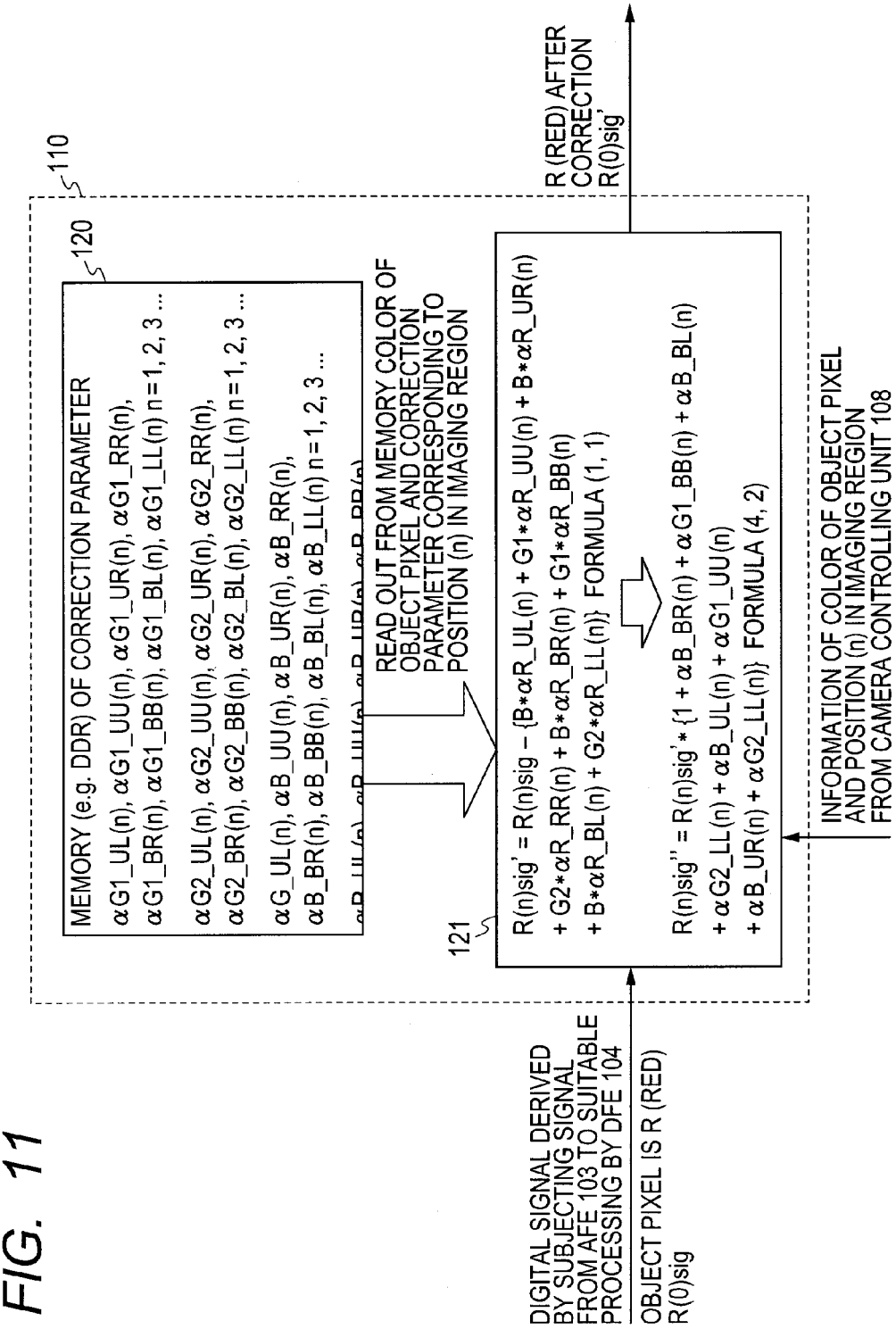
FIG. 11 is a diagram illustrating a summary of the cross talk correcting apparatus of the fourth embodiment.

FIG. 11 is a diagram illustrating an example of configuration of the cross talk correcting apparatus 110 according to a fourth embodiment of the present invention. The cross talk correcting apparatus 110 includes the memory 120 and the correcting unit 121. The present embodiment is designed to further improve the correction accuracy of the first embodiment. The different points of the present embodiment from the first embodiment will be described. The present embodiment is designed to improve the accuracy of the cross talk correction by adding the amount of cross talk from the object pixel to the adjacent pixels again to the output of the object pixel. A further reduction in the cross talk is possible by executing a correction process based on the following formulas after the correction process of Expressions (1.1), (1.2), (1.3), and (1.4) illustrated in the first embodiment. An example of applying the process to the pixel R will be described. FIG. 10A illustrates, by the correction parameters, the light and the electric charge leaked from the pixel R. Similarly, FIG. 10B illustrates, by the correction parameters, the light and the electric charge leaked from the pixel G2. Although not illustrated, similar drawings can be depicted for the pixels B and G1. The correction parameters illustrated in the first to third embodiments are used. As in the first to third embodiments, the correction parameters (for example, $\alpha R\_UU(n)$) are selectively used depending on the imaging regions. The correcting unit 121 applies correction processes to the light and the electric charge leaked from the pixels G1, R, B, and G2 by Expressions (4.1) to (4.4), respectively. In the present embodiment, the object pixels to be corrected are pixels from which the light and the electric charge are leaked. A signal before the correction of the pixel G1 is indicated by G1(n)sig', and a signal after the correction is indicated by G1(n)sig". Similarly, a signal before the correction of the pixel R is indicated by R(n)sig', and a signal after the correction is indicated by R(n)sig". Similarly, a signal before the correction of the pixel B is indicated by B(n)sig', and a signal after the correction is indicated by B(n)sig". Similarly, a signal before the correction of the pixel G2 is indicated by G2(n)sig', and a signal after the correction is indicated by G2(n)sig". More specifically, the correcting unit 121 inputs the signals G1(n)sig', R(n)sig', B(n)sig', and G2(n)sig' before the correction to read out the correction parameters in the memory 120. The correcting unit 121 then calculates and outputs the signals G1(n)sig", R(n)sig", B(n)sig", and G2(n)sig" after the correction.

$$G1(n)\text{sig}''=G1(n)\text{sig}'\times[1+\alpha G2\_BR(n)+\alpha R\_BB(n)+\alpha G2\_BL(n)+\alpha B\_LL(n)+\alpha G2\_UL(n)+\alpha R\_UU(n)+\alpha G2\_UR(n)+\alpha G1\_LL(n)] \quad \text{Expression (4.1)}$$

$$R(n)\text{sig}''=R(n)\text{sig}'\times[1+\alpha B\_BR(n)+\alpha G1\_BB(n)+\alpha B\_BL(n)+\alpha G2\_LL(n)+\alpha B\_UL(n)+\alpha G1\_UU(n)+\alpha B\_UR(n)+\alpha G2\_LL(n)] \quad \text{Expression (4.2)}$$

$$B(n)\text{sig}''=B(n)\text{sig}'\times[1+\alpha R\_BR(n)+\alpha G2\_BB(n)+\alpha R\_BL(n)+\alpha G1\_LL(n)+\alpha R\_UL(n)+\alpha G2\_UU(n)+\alpha R\_UR(n)+\alpha G1\_LL(n)] \quad \text{Expression (4.3)}$$

$$G2(n)\text{sig}''=G2(n)\text{sig}'\times[1+\alpha G1\_BR(n)+\alpha B\_BB(n)+\alpha G1\_BL(n)+\alpha R\_LL(n)+\alpha G1\_UL(n)+\alpha B\_UU(n)+\alpha G1\_UR(n)+\alpha R\_LL(n)] \quad \text{Expression (4.4)}$$

In this way, the correcting unit 121 adds the cross talk signal leaked from the object pixel to the adjacent pixels to the signal of the object pixel to generate the signals G1(n)sig", R(n)sig", B(n)sig", and G2(n)sig" after correction. In the present embodiment, the cross talk correction parameters of the center region and the peripheral regions of the imaging region can be selectively used to reduce the cross talk throughout the entire region of the imaging region. In consideration of the time required for the correction process, the imaging region may be divided into some regions A to I as illustrated in FIG. 4 to selectively use the cross talk correction parameters. It is the same as in the first embodiment that the correction process using the upper left, upper right, lower left, and lower right cross talk correction parameters with relatively less cross talk can be skipped depending on the application. The method of roughly dividing the imaging region into the regions A to I as illustrated in FIG. 4 can also be used when the frame rate is high, with the same advantage as in the first embodiment.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-217379, filed Sep. 18, 2009, and Japanese Patent Application No. 2009-217380, filed Sep. 18, 2009 which are hereby incorporated by reference herein in their entirety.

What is claimed is:

1. An image processing apparatus for a solid-state imaging apparatus comprising a plurality of pixels each including a photoelectric conversion element arranged two dimensionally in a matrix and a color filter of plural colors is arranged over a surface of the pixel, such that the image processing apparatus corrects a cross talk between adjacent pixels of different colors, wherein the image processing apparatus comprises:

a memory unit for storing a correction parameter for reduction a cross talk signal leaked to an object pixel from an adjacent pixel, the correction parameter corresponding to a position of the object pixel; and a correcting unit for subtracting, based on the correction parameter stored in the memory unit, the cross talk signal from a pixel signal of the solid-state imaging apparatus correspondingly to a position of the pixel, wherein a number of the object pixel is at least two, and the at least two object pixels have different addresses in a horizontal direction, and different addresses in a vertical direction, and wherein, in moving image photographing mode, the correction parameter is derived from pixels in a column adjacent to the object pixel and pixels in a row adjacent to the object pixel, while, in a mode different from the moving image photographing mode, the correction parameter is derived from pixels adjacent to the object pixel in a column direction, pixels adjacent to the object pixel in a row direction, and pixels adjacent to the object pixel in an oblique direction.

2. The image processing apparatus according to claim 1, wherein the correction parameter of a pixel in a center region of the solid-state imaging apparatus is different from the correction parameter of a pixel in a peripheral region of the solid-state imaging apparatus.

3. The image processing apparatus according to claim 1, wherein the plurality of pixels is divided into a plurality of pixel regions, such that the memory unit stores the correction parameter of the pixels by pixel region, and the correcting unit subtracts, based on the correction parameter of the pixels in one pixel region, the cross talk signal from the pixel signal of the pixels in the same one pixel region.

4. The image processing apparatus according to claim 1, wherein the memory unit stores the correction parameter corresponding to a plurality of positions of the pixels, and the correcting unit subtracts, based on the correction parameter corresponding to a nearest position of the pixel, the cross talk signal from the pixel signal.

5. The image processing apparatus according to claim 1, further comprising a calculating unit for calculating the correction parameter based on a signal derived from an aperture pixel of the solid-state imaging apparatus and on a signal derived from a light shielded pixel adjacent to the aperture pixel, and then storing the correction parameter in the memory unit.

6. The image processing apparatus according to claim 1, wherein the solid-state imaging apparatus includes a first aperture pixel, a second aperture pixel, a first light shielded pixel in the same row as a row along which the first aperture pixel is arranged, a second light shielded pixel in the same column as a column along which the first aperture pixel is arranged, a third light shielded pixel in the same row as a row along which the second aperture pixel is arranged, a fourth light shielded pixel in the same column as a column along which the second aperture pixel is arranged, the memory unit stores the correction parameter of the first aperture pixel and the correction parameters of the first to fourth light shielded pixels, and the correcting unit calculates the correction parameter of the second aperture pixel based on the correction parameter of the first aperture pixel and the correction parameters of the first to fourth light shielded pixels, and subtracts, based on the correction parameter of the correction parameter of the second aperture pixel, the cross talk signal from the pixel signal of the second aperture pixel.

7. The image processing apparatus according to claim 1, wherein the correcting unit subtracts the cross talk signal from the pixel signal, according to at least one of an aperture value and a pupil distance controlled by an optical system of the solid-state imaging apparatus.

8. The image processing apparatus according to claim 1, wherein the correcting unit adds, to the signal of the object pixel, the cross talk signal leaked to the object pixel from the adjacent pixel.

9. An imaging system comprising:

the image processing apparatus according to claim 1; and a solid-state imaging apparatus comprising a plurality of pixels each including a photoelectric conversion element arranged two dimensionally in a matrix and a color filter of plural colors is arranged over a surface of the pixel.

\* \* \* \* \*